Dec. 17, 1929.  H. C. GIBSON  1,740,297
LUBRICATION FITTING
Filed May 27, 1927
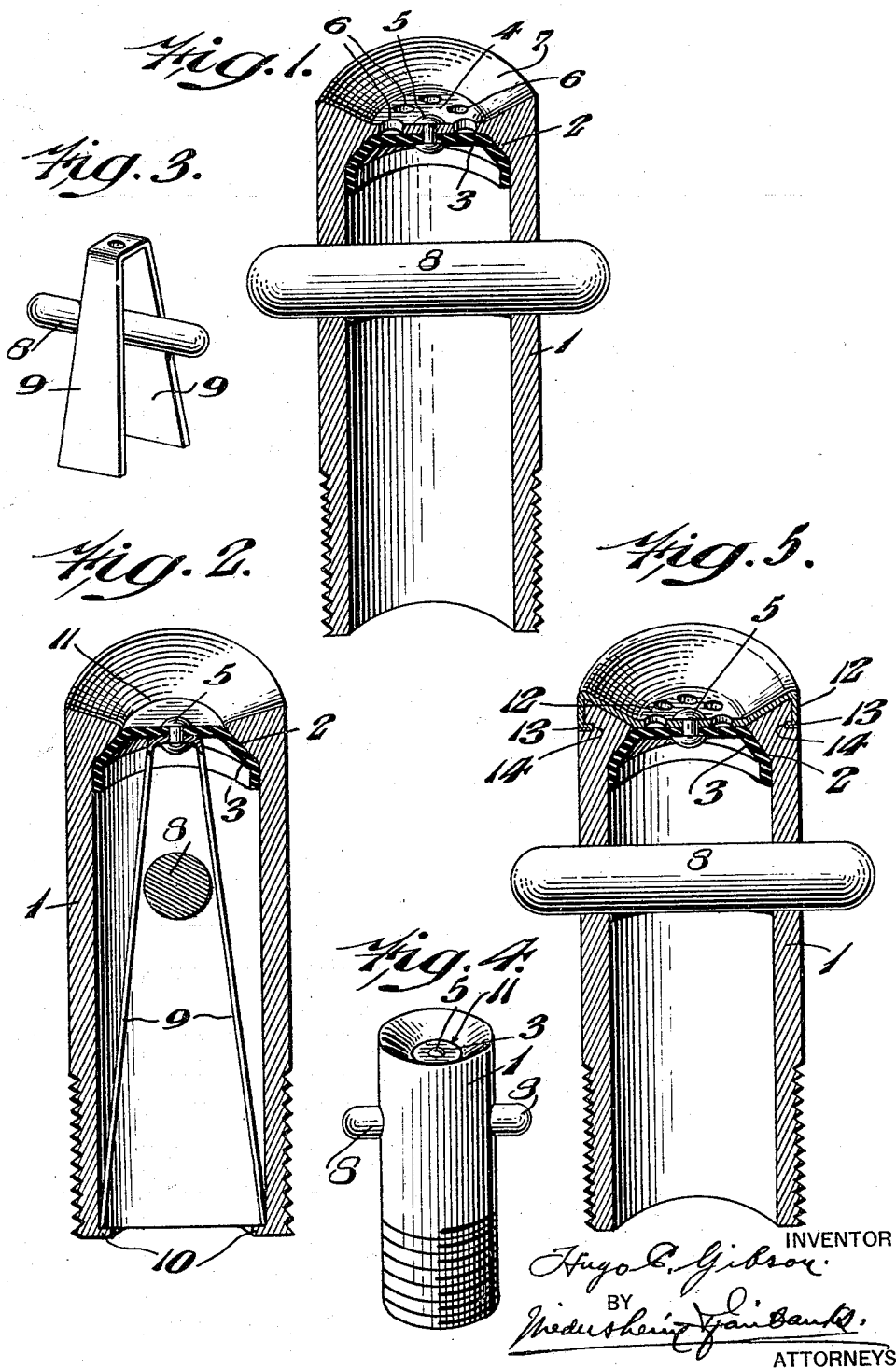

Patented Dec. 17, 1929

1,740,297

UNITED STATES PATENT OFFICE

HUGO C. GIBSON, OF PHILADELPHIA, PENNSYLVANIA, ASSIGNOR OF ONE-HALF TO E. HAYWARD FAIRBANKS, OF MERCHANTVILLE, NEW JERSEY

LUBRICATION FITTING

Application filed May 27, 1927. Serial No. 194,635.

My novel invention relates to a novel lubrication fitting for attachment to machines whereby lubricant under high pressure may be applied to the bearings of those machines in a cleanly manner.

Heretofore such fittings have been furnished with ball, non-return or check valves in the path of the passage for lubricant through the fitting, said ball or check valves being pressed onto their seat by springs which are held between the ball and some ledge or abutment within the fitting. Grit or foreign matter frequently lodges between the ball and its seat and deformation of the seat occurs through the fitting being struck by tools or the like, with the result that the ball fails to make a grease tight seal and extrusion of the grease occurs. Consequently the machinery becomes unclean.

The object of my invention is to provide a lubrication fitting which shall be free from the above disadvantages, shall be tightly sealed against extrusion, and shall furnish a free passage for lubricant applied to the fitting.

For the purpose of illustrating my invention I have shown in the accompanying drawings two forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawings;

Fig. 1, represents a perspective sectional view of a fitting embodying my invention.

Fig. 2, represents a perspective sectional view of a modification.

Fig. 3, represents a perspective of the valve support seen in Fig. 2.

Fig. 4, represents, on a reduced scale, a perspective view of the fitting seen in Fig. 2.

Fig. 5, represents a sectional perspective view of a modification.

In the various figures, similar numerals of reference indicate corresponding parts.

Referring now to Fig. 1, 1 designates the body of my novel fitting, which is preferably of standard pipe size and furnished at one end with a standard male pipe thread whereby the fitting may be inserted in a machine bearing housing. At the other end of the fitting is an inwardly formed seat 2 arranged to accommodate the cup shaped, flexible valve 3 which is attached at its center to the center of the integral head 4 of the body by the rivet or other fastening device 5. This head is pierced with holes 6, permitting the passage of lubricant, and its surface 7 is preferably dished generally as shown. A bar 8 passing transversely through the fitting projects beyond the body to form lugs for the attachment of a hose coupling or lubricating gun in the well known manner of a bayonet joint.

In Fig. 2, is shown a body 1 having a seat 2 for the cup shaped valve 3 which is attached at its center by a rivet 5 to a supporting arch 9 which is carried upon inwardly extending projections 10 upon the internal surface of the fitting body. The concentric hole 11 is provided for the passage of lubricant to and past the valve 3.

In Fig. 3, is shown the relation of the valve support 9 to the bar 8.

In Fig. 5, is shown a method of holding the cup shaped valve 3 in position juxtaposed to its seat 2, whereby the valve 3 is attached by means of the rivet 5 to a perforated disc 12, which is spun over the end of the body 1, so that its edge 13 engages the groove 14 formed in the body 1.

The operation is as follows: Upon a grease gun or pressure lubricator device being attached to the fitting by means of the lugs of the bar 8, and lubricant under pressure being applied to the valve 3, said valve becomes deflected from its seat, whereby the lubricant will pass thereby into the fitting and so to the bearing to which the fitting it attached. When the pressure lubricating device is removed from the fitting, the valve 3 closes against its seat and seals the fitting against extrusion of grease therefrom.

I am aware of the patents to Gullborg, Nos. 1,307,733 and 1,307,734, and my invention is differentiated therefrom since I dispense entirely with the use of springs to seat the check valve, my novel valve being held against its seat by a central fastening means common to the valve and to the fitting body.

It will now be apparent that I have devised a novel and useful construction which embodies the features of advantage enumerated as desirable in the statement of the invention and the above description, and while I have in the present instance shown and described the preferred embodiments thereof which have been found in practice to give satisfactory and reliable results, it is to be understood that the same are susceptible of modification in various particulars without departing from the spirit or scope of the invention or sacrificing any of its advantages.

Having thus described my invention, what I claim as new, and desire to secure by Letters Patent, is:

1. In a lubrication fitting a tubular body, a flexible disk valve seating upwardly and controlling an end thereof, said disk valve being shaped to have a snug fit with both the top and side walls of said tubular body, and rigidly central supporting and securing means for said valve carried by said body.

2. In a lubrication fitting, a body portion, a valve seat therein, a flexible inverted cup shaped valve, and a rigid centrally disposed support for said valve common to the latter and said body.

3. In a lubrication fitting, a body portion, an internal valve seat below the top of said body and integral therewith, a flexible cup shaped valve cooperating with said valve seat, and a fixed support for said valve.

4. In a lubrication fitting, a body, a flexible inverted cup-shaped upwardly seating valve therein, a rigid central support for said valve carried by said body, and lugs projecting laterally from said body below said valve.

5. In a lubrication fitting, a body portion having at one end means for attachment to machinery, and at the other end a ported dished face, an internal valve set below the top of said body, a flexible cup shaped valve cooperating with said valve seat, and a rigid support for said valve.

6. In a lubrication fitting, a body portion having at one end means for attachment to machinery and at the other end a ported dished face, an internal valve seat below the top of said body, a flexible cup shaped valve cooperating with said valve seat, a rigid support for said valve, and lugs projecting from the outer surface of said body.

7. In a lubrication fitting, a body, a flexible inverted cup-shaped upwardly seating valve therein, a rigid central support for said valve carried by said body, and a bar extended transversely through said body below said valve and projected laterally therefrom to provide attachment lugs.

HUGO C. GIBSON.